United States Patent [19]

Mittelmann

[11] 4,032,740

[45] June 28, 1977

[54] TWO-LEVEL TEMPERATURE CONTROL FOR INDUCTION HEATING

[75] Inventor: Eugene Mittelmann, Chicago, Ill.

[73] Assignee: Illinois Tool Works Inc., Chicago, Ill.

[22] Filed: Apr. 7, 1975

[21] Appl. No.: 566,003

[52] U.S. Cl. .................. 219/10.77; 219/10.53; 219/10.41

[51] Int. Cl.² .................................. H05B 5/04

[58] Field of Search ......... 219/10.77, 10.75, 10.49, 219/10.53, 10.57, 10.43, 10.41, 10.55 B, 492, 494; 156/272, 275, 380

[56] References Cited

UNITED STATES PATENTS

| | | | |
|---|---|---|---|
| 2,267,001 | 12/1941 | Toulmin | 219/10.41 |
| 2,988,623 | 6/1961 | Ross et al. | 219/10.75 X |
| 3,183,294 | 5/1965 | Kasper | 219/10.77 X |
| 3,591,752 | 7/1971 | Valdes | 219/10.77 |
| 3,740,859 | 6/1973 | Patton et al. | 219/10.77 X |
| 3,781,504 | 12/1973 | Harnden | 219/10.77 X |
| 3,816,690 | 6/1974 | Mittleman | 219/10.77 |
| 3,845,268 | 10/1974 | Sindt | 219/10.77 |

*Primary Examiner*—Bruce A. Reynolds
*Attorney, Agent, or Firm*—Thomas W. Buckman; Robert W. Beart

[57] ABSTRACT

An induction heating apparatus and related temperature control circuitry and method of controlled heating of a workpiece at two temperature levels. The apparatus and method utilizes a temperature sensing device, adjustable reference temperature circuitry utilizing a voltage dividing circuit triggered by a timing circuit to heat the workpiece to a first predetermined temperature, dwell at the predetermined temperature for an amount of time governed by the timing device and continue heating the workpiece to a second predetermined desired temperature. The method and circuitry being particularly useful in heating a laminar structure where a ferromagnetic material is coated with a surface of nonconducting, nonferromagnetic material, such as paint.

11 Claims, 8 Drawing Figures

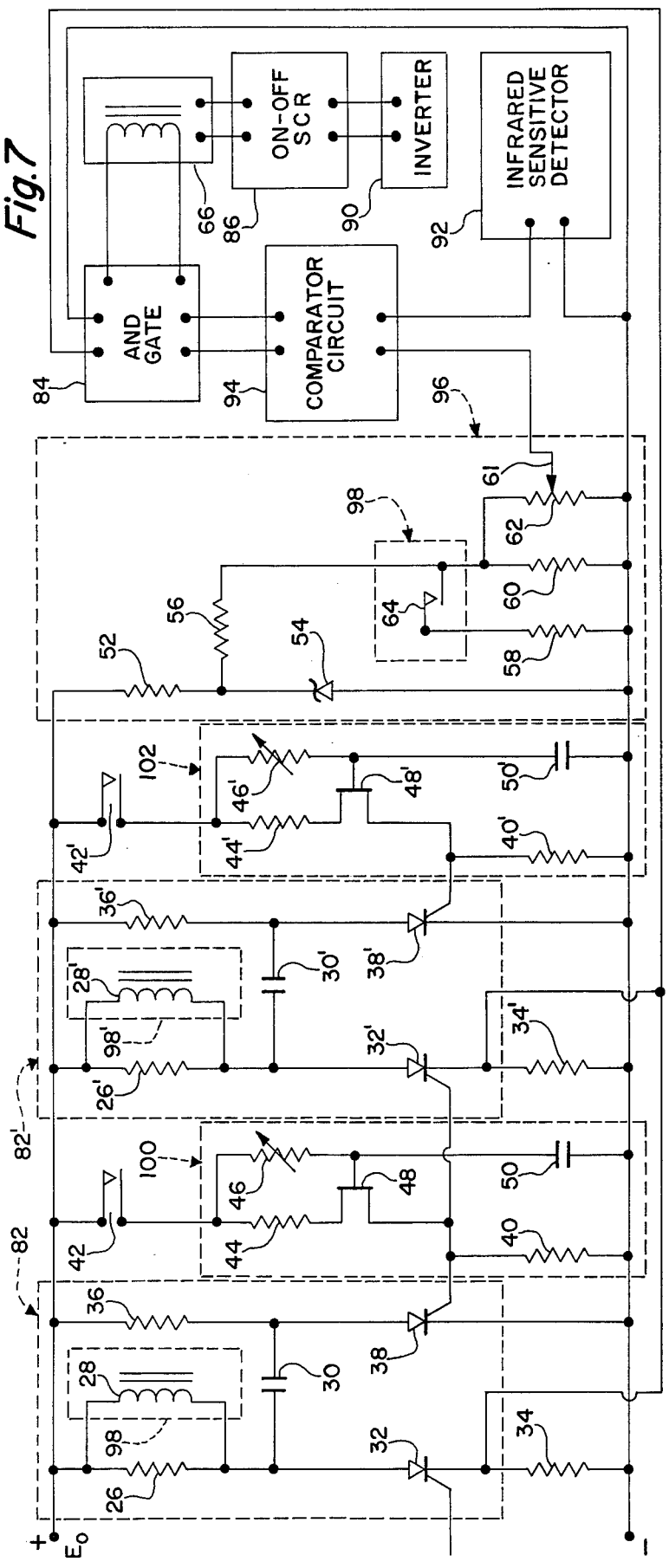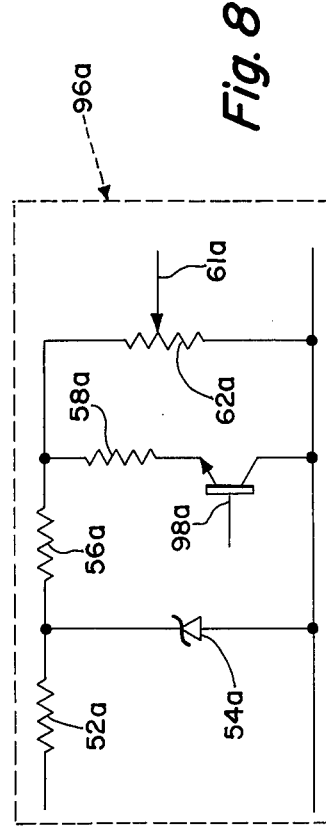

TWO-LEVEL TEMPERATURE CONTROL FOR INDUCTION HEATING

BACKGROUND OF THE INVENTION

Many attempts have been made recently to develop a new technology of securing various mechanical elements to base structures by using adhesive rather than mechanical fasteners. Two general classes of adhesive have been utilized in this technology, namely pressure sensitive and heat activated adhesive. In the case of heat activated adhesive, the use of induction heating techniques were the logical choice as the energy source for activating the adhesive when at least one of the elements to be bonded had ferromagnetic characteristics. The main advantage of induction heating techniques over more customary heating methods is the ability to raise the temperature of metallic surfaces to high levels in a relatively short time. Due to the fact that heat is generated in the body to be heated and does not rely on heat transfer from the heat source to the body, the process is not associated with a general time lag characterizing other methods. Because of the short heating times involved, it becomes of utmost importance to devise techniques which would permit the exact control of the final temperature, either for the purpose of terminating the heating process at the instant when the final temperature was reached or to be able to maintain a desired final temperature at a constant level for an arbitrarily selected time period.

A special problem in this regard arises in the application where the ferromagnetic material to which the parts must be bonded is covered with a nonconductive, nonferromagnetic layer, such as for instance a layer of paint or other coating. All such coatings will have an upper temperature limit which cannot be exceeded without severely damaging the coating. At the same time, it is desirable to maintain the temperature of the coating at a temperature sufficient to activate the adhesive for a certain period of time in order to obtain satisfactory bonding. However, only the surface temperature of the coating and not the temperature at the interface between the coating and the sheet of ferromagnetic material is accessible for purposes of measurement and control. Previous methods utilized to control the final temperature of a surface incorporated what is generally referred to in control engineering as "proportionate control methods," i.e., reducing the power input to the induction heating generator as a function of the rate of temperature rise or using the two position method, particularly in connection with high power vacuum tube generators, using magnetic amplifiers or similar techniques to disengage the high voltage rectifier system supplying power to the oscillator tube. There are also several methods developed in industry where solid state generators were used and control was exercised by the use of power input to the workpiece, using pulse width modulation techniques or similar methods. In one example of prior art methods, control is exercised by changing the repetition rate of pulses having equal energy content.

The major problem associated with previous methods is the difficulty in avoiding overshooting the desired temperature levels or the complexity of circuitry to accomplish such a goal. In either event it is apparently necessary to establish control settings by rather complex experimental methods.

SUMMARY OF THE INVENTION

In accordance with one aspect of the invention, a U-shaped inductance core is integrated as a unit with a fiber optic sensing element and this core is then operatively associated with an inverter either of the parallel or series type.

The invention described also contemplates a method of heating by induction a workpiece of ferromagnetic material which is coated with a paint or other nonconducting material without exceeding a critical temperature related to the deterioration of the paint layer. Such heating is accomplished by considering the different rates of heat relatable to both the paint layer and the ferromagnetic material, monitoring the surface temperature of the paint layer, turning the power off to eliminate the energy input to the system when the temperature sensed at the paint layer is lower than the desired temperature and also at a temperature which reflects an interface temperature below the maximum temperature. The first predetermined temperature is maintained at a constant level for a fixed period of time after which the power is activated to further increase the temperature of both the paint and the ferromagnetic material in such a manner as to provide a temperature differential between the two which is very small, thus serving to eliminate the possibilities of overshooting.

The circuitry for accomplishing this heating method basically includes an infrared sensing detector, an operational amplifier comparator which accepts the output from the infrared detector and also accepts output from an adjustable reference source which is calibrated in terms of temperature. The adjustable reference source is essentially a voltage dividing circuitry supplied from a constant voltage source which is responsive to a preset timing circuit. The operation of the timing circuit in conjunction with the reference source is such as to turn off the power at a predetermined temperature for a given time span after which the voltage input to the comparator from the reference source changes and is directly related to a slightly higher temperature level which now is the desired temperature level. Such a circuit thus allows a dwell period which will thereafter permit the surface layer to be heated to its desired temperature in such a manner as to greatly reduce the temperature differential between the paint layer and the ferromagnetic material.

Other objects and features, as well as a full understanding of the invention, will appear by reference to the following detailed description, drawings and claims.

BRIEF DESCRIPTION OF THE DRAWINGS

FIG. 7 is a detailed schematic circuit diagram of a preferred embodiment of the two-level temperature control of the present invention.

FIG. 8 is a detailed schematic circuit of an alternate embodiment of the adjustable reference temperature portion of the instant invention.

DESCRIPTION OF THE PREFERRED EMBODIMENT

Figure 1:
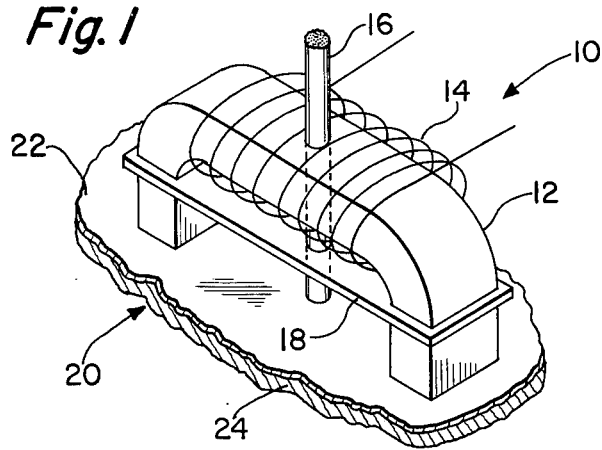
FIG. 1 is a partial perspective view of the core integrated with fiber optic sensing element and in position to heat a workpiece which has been coated with a nonconductive material.

Turning now to FIG. 1, there is shown a preferred embodiment of the heating core unit 10 which includes a U-shaped core element 12 with an exciter coil 14 wound about, inducing a current therein. This coil 14 could, for example, be connected directly to the secondary winding of a transformer of a parallel inverter, e.g., an inverter of the MacMurray type. An exampler of such a core and power supply appropriate for purposes of this invention may be seen in U.S. Pat. No. 3,816,690 issued on June 11, 1974. It will be seen that the core unit 10 will have integrated therein a fiber optic element extending through the bridge of the core, positioned by a holding structure 18 so that the receiving extremity of the fiber optic element looks at the workpiece to be heated at a position intermediate the legs of the core in order to obtain correct and valid temperature measurements simultaneous with the heating of the workpiece. The entire unit thus described may thereafter be potted in a conventional manner.

The workpiece to be heated 20 comprises a sheet of ferromagnetic material 24 covered by a surface layer of paint or other nonconducting, nonferromagnetic material 22. It is this particular situation that the present invention is primarily concerned with. The fastening of some device to the workpiece, and more specifically to the surface of the paint layer 22, through a bonding layer of heat activatable adhesive must be done cognizant of certain problems. All coatings, such as layer 22, have an upper temperature limit which cannot be exceeded without severely damaging the coating. All heat activatable adhesives have a certain minimum temperature which must be obtained in order to effect bonding. In the example described herein, the heat for activating the adhesive is obtained through contact with the adhesive on the upper surface of the paint layer 22. Therefore, this upper surface 22 must be raised to a certain minimum temperature. It is clear that the temperature which the layer 22 is subjected to may necessarily be controlled within a narrow limit.

Figure 2:
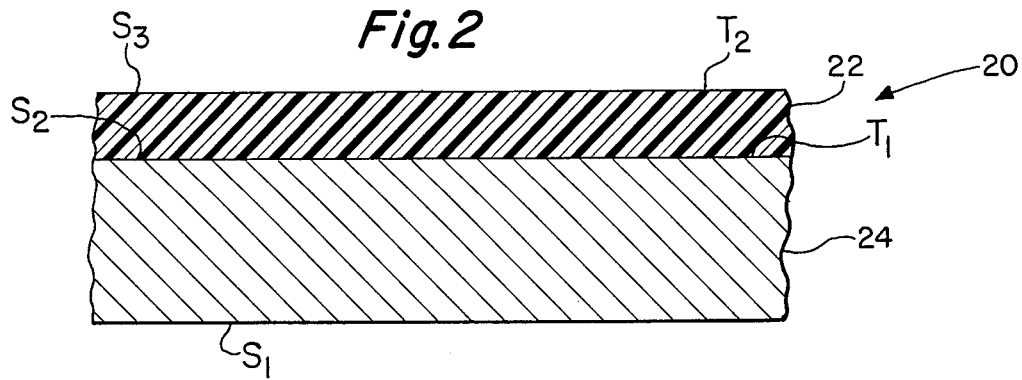
FIG. 2 is a greatly enlarged cross-sectional view of a workpiece coated with a paint-type material.

To reach the necessary activation temperature in the example described, the sheet material 24 is heated by induction heating techniques using a core such as unit 10. With reference to FIG. 2, the thickness of the sheet 24 is generally small enough to justify the assumption that the temperature on the lowermost surface S1 and the interface surface S2 are equal and represented by temperature $T_1$ when applying energy to it from an induction heating source. As heat is generated in the metallic sheet 24, it transfers this heat by heat conduction through the paint layer 22 to the heat activatable adhesive layer. Because the paint layer does have a certain transfer coefficient, the temperature $T_1$ on the interface surface S2 will be higher than the temperature $T_2$ at the upper surface of the paint.

A temperature sensing device such as one utilizing the fiber optic element 16, obviously, has only access to the outer surface S3 of the paint. Under circumstances where it is essential not to exceed a certain temperature in order not to damage the paint, it is evident that controlling to this temperature limit by sensing the temperature on the outer surface of the paint is insufficient because the interface temperature $T_1$ may be considerably higher. As an example of such condition, the activation temperature of an adhesive may be 285° F and the damaging temperature of the paint be 300° F. Controlling the outer paint surface by means of a temperature sensor set not to exceed 300° F would be useless in as much as the actual interface temperature $T_1$ would probably be far in excess of 300° F. Actual measurements of the heat transfer coefficient of certain thermoplastic paints indicate that the temperature gradient between the interface of the paint and metal layer and the outer surface of the paint might be as high as 15°–20° F.

Figure 4:
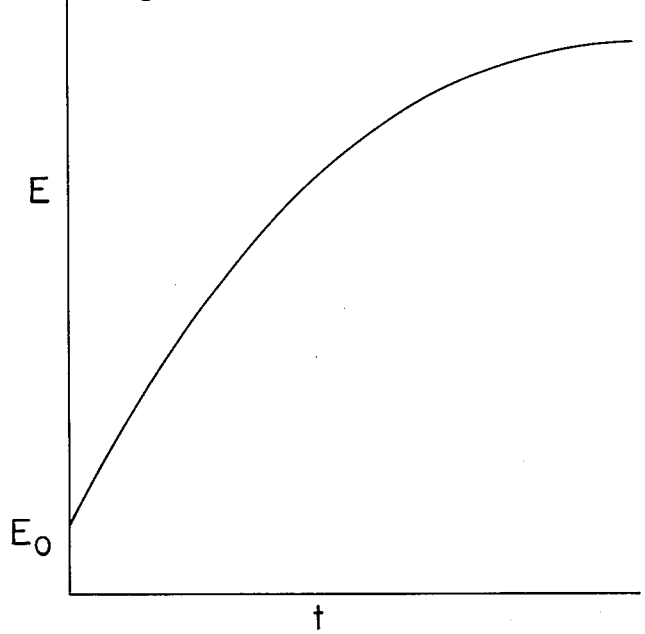
FIG. 4 is a curve representing the behavior of the voltage relative to time elapse of the electrical analogue.
Figure 3:
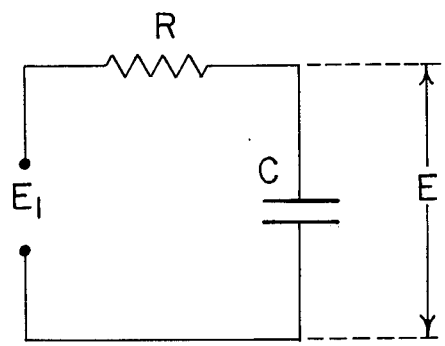
FIG. 3 is a simplified circuit representing the electrical analogue having characteristics similar to the heating characteristics of the workpiece section.

The temperature sensing problems described above may be represented by an electrical analogue circuit shown in FIG. 3 which describes the charging of a capacitor C through a resistance R from a constant voltage source $E_1$. If the initial charge on the capacitor C corresponds to a voltage $E_0$, then the behavior of the voltage E across the capacitor is given by the standard equation (1) with FIG. 4 representing its characteristic curve.

$$E = E_1 (1 - e^{-t/RC}) + E_0 e^{-t/RC} \qquad (1)$$

Using this equation and substituting temperatures for voltage $$T = T_1 (1 - e^{-t/RC}) + T_0 e^{-t/RC} \qquad (1A)$$

Equation 1A will accurately describe the transfer situation, where RC this time denotes the thermal time constant of the nonconducting, nonferromagnetic layer 22. However, equation 1A does not apply to the actual heating situation described above inasmuch as the temperature at the interface $T_1$ itself increases as a function of time when power is absorbed in a continuous manner at a constant rate. We might, however, assume that this increase takes place as a linear function of time. $T_1$, thus, will rise linearly with time from an initial value $T_0$. If a thermal equilibrium existed at the start of the heating process, the surface temperature $T_2$ of the coating 22 will rise from the same initial value but in a nonlinear manner, due to the finite value of the time constant RC. Obviously, $T_1$ will rise at a more rapid rate than $T_2$, and it is this behavior of the surface temperature $T_2$ which is the source of the problem to be solved by this invention.

It can be shown that the temperature differential $\Delta T$ existing at any time t, measured in seconds, is described by the following equation.

$$\Delta T = \alpha RC (e^{-t/RC} - 1) \qquad (2)$$

RC again denotes the thermal time constant of the coating 22 and $\alpha$ denotes the rate of temperature rise in degrees per second for a given constant value of absorbed power at the interface. Significantly, this equation No. 2 does not contain the term T of the initial temperature $T_0$, meaning that the temperature gradient between the interface surface S2 and the outer surface S3 of the coating is, at any given instant, independent of the valve of the initial temperature existing at the instant when high frequency energy is again applied. It is this relationship which leads to the introduction of the two-level temperature control of the present invention.

Figure 5:
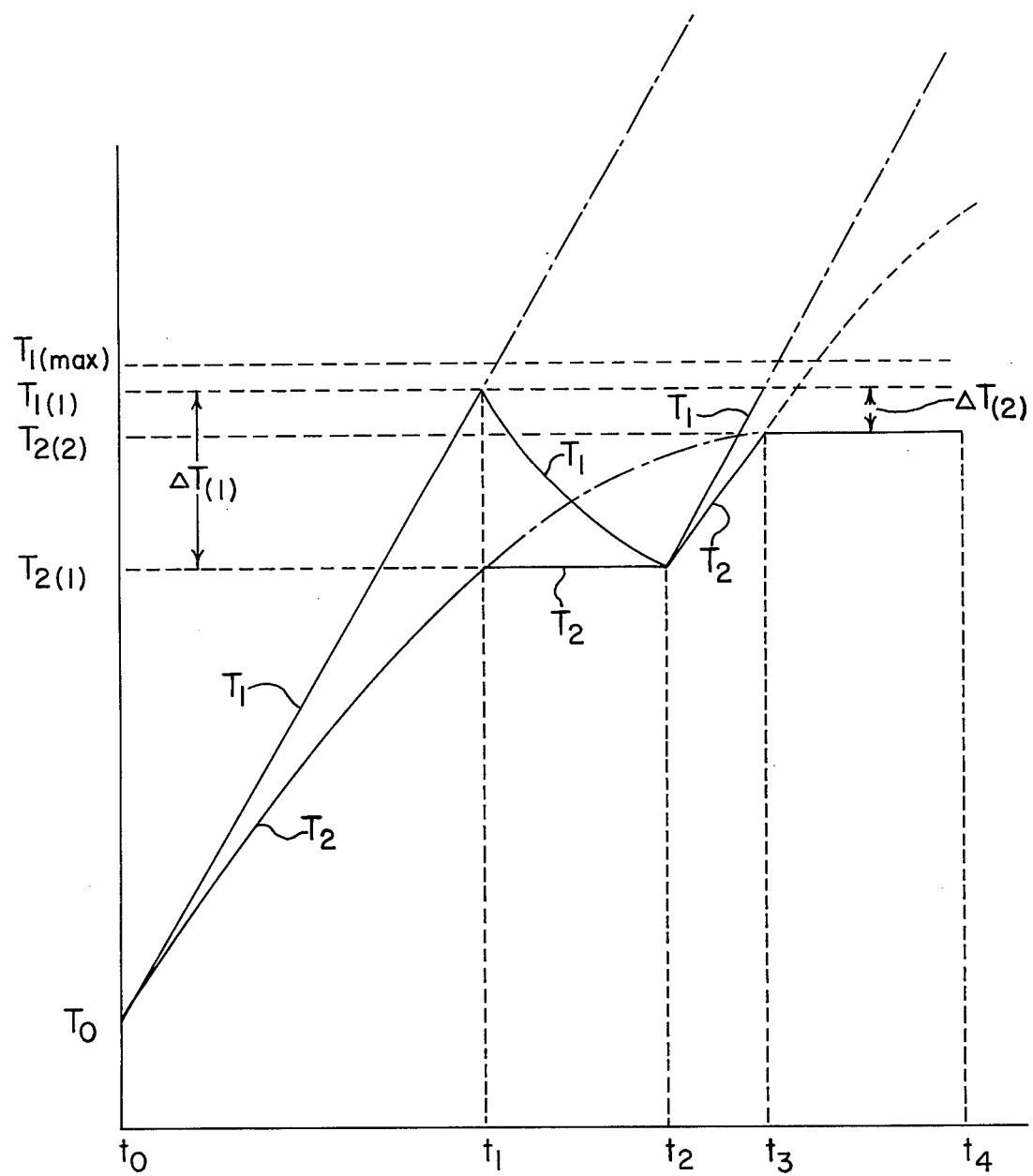
FIG. 5 is a graphical representation of the time/temperature relationship occurring during heating by the method of the present invention.

Reference to FIG. 5 will facilitate the description of the two-level temperature control method of this invention. At time $t_o$ both the interface temperature $T_1$ and temperature $T_2$ at outer surfaces S3 of the paint layer are substantially equal and identified as $T_o$. Upon application of heat energy by induction means to the sheet material 24, the two temperatures $T_1$ and $T_2$ will rise as a function of time shown in this FIG. 5. A predetermined temperature level $T_{2(1)}$ of the paint layer 22 is monitored by means such as an infrared sensitive detector including a fiber optic element. This predetermined temperature $T_{2(1)}$ will be lower than the final desired temperature $T_{2(2)}$ which will be the activation temperature of the adhesive and will be determined utilizing the relationship of equation 2 taking into account $T_{1(max.)}$ as the temperature not to be exceeded at the interface and the unavoidable temperature differential $\Delta T$. When the temperature $T_{2(1)}$ is reached, $T_{1(1)}$ will be higher than $T_2$ but less than $T_{1(max.)}$, a control system maintains this temperature $T_{2(1)}$ substantially constant for a predetermined length of time, for example $(t_2 - t_1)$, to permit equalization between the interface temperature $T_1$ and the temperature $T_2$. Once equalization of $T_2$ and $T_1$ has been reached, power is applied again at the same rate and continued until the surface temperature $T_2$ has reached the desired final level $T_{2(2)}$ and is there monitored automatically for a second predetermined additional length of time, such as $(t_4 - t_3)$. During the time period $(t_2 - t_1)$, power may be alternately turned off and on while the interface temperature $T_1$ drops as a result of cooling by radiation and conduction to surrounding areas, including to the nonmetallic coating 22. During this time period, when the power is basically off, heat flowing from the higher temperature interface surface S2 compensates for the reduction of the surface temperature $T_2$ due to cooling thereof. In actual practice, the time interval $(t_2 - t_1)$ will be relatively short in comparison with the final dwell time $(t_4 - t_3)$, the last-mentioned time interval being determined by the chemical characteristics of the heat activated adhesive. For most such adhesives, the dwell time necessary to obtain a reliable and satisfactory bond is in the order of magnitude of 5 to 15 seconds, a time which is long in comparison to that needed for the equalization of temperatures on the surface and the interface at the lower temperature level.

At time $t_2$, the surface and interface temperature are equalized and power is applied once more allowing the interface temperature $T_1$ to rise linearly with the same slope as occurring in the interval $(t_1 - t_o)$.

However, during the interval $(t_3 - t_2)$, the automatic temperature monitor control has been changed to permit the surface temperature to rise to its selected final level $T_{2(2)}$. It is important to note that at the end of the time period $t_4$, $\Delta T_{(2)}$ will be far smaller than the $\Delta T_{(1)}$ existing before at $T_{2(1)}$, thus enhancing a smooth control without overshoot.

Figure 6:
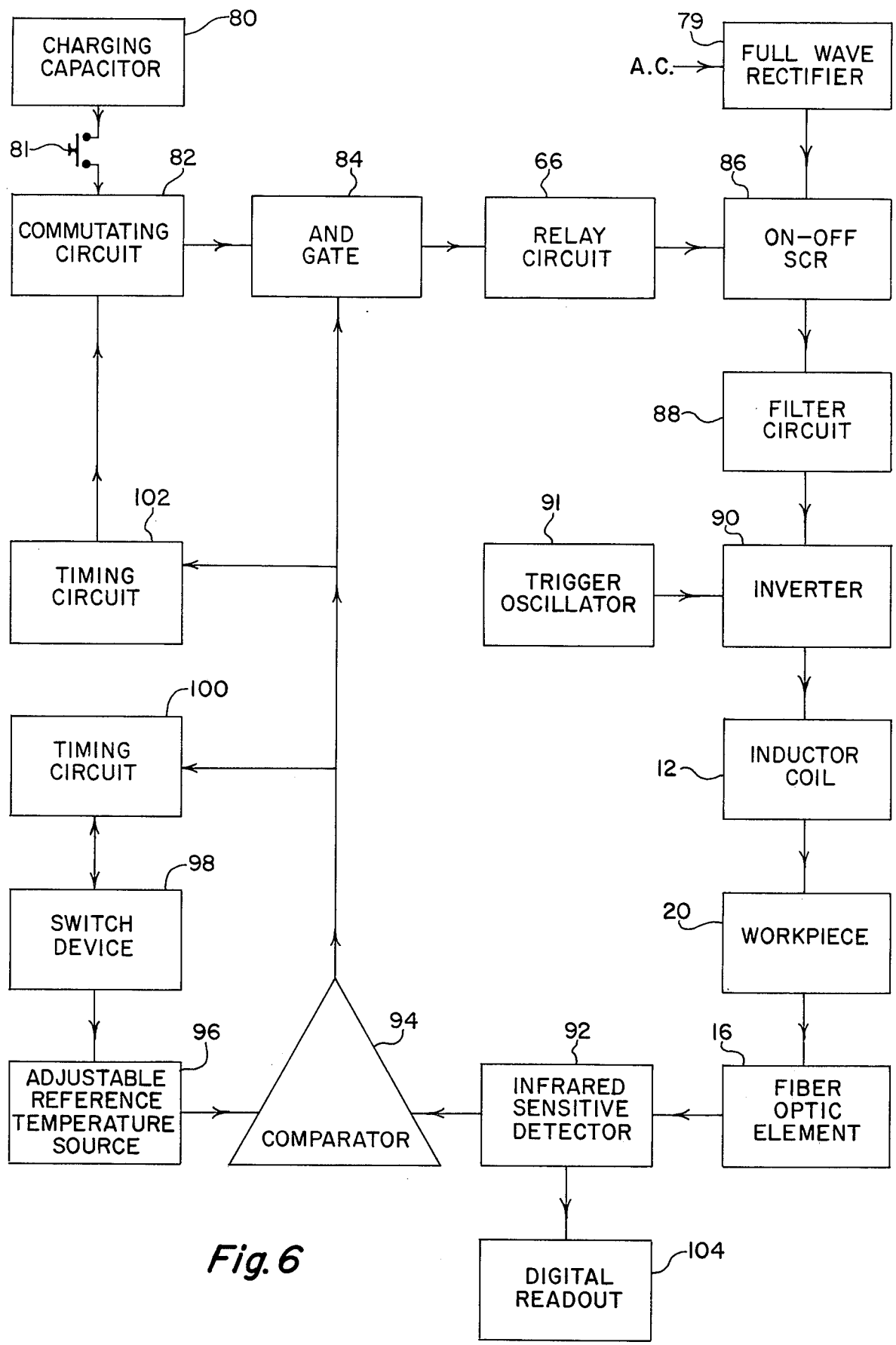
FIG. 6 is a circuit schematic in block diagram form of the two-level heating system of the present invention.

FIG. 6 shows a simplified block diagram of the equipment used to implement the above two control method. The entire unit may be operated from the 60 Hz alternating current line. A full wave rectifier 79 supplies the inverter 90, through an on-off SCR 86 and a filter circuit 88 with D.C. current. The inverter 90 may be of the parallel inverter type driven at its gate by a 10 kHz trigger oscillator 91. A horseshoe type inductor coil 12 is coupled to the inverter and applied directly to the workpiece 20. The surface temperature of the workpiece is monitored by a fiber optic element 16. The infrared radiation collected by the fiber optic element is supplied to an infrared sensitive detector 92 which may include a photo sensitive device capable of being activated by infrared radiation, a chopper amplifier, operating at a frequency of 400 cycles or thereabouts and an A.C. to D.C. converter to which a linearizing amplifier is added to make the output of the infrared detector directly proportional to the temperature sensed by the fiber optic element 16. Appropriate analogue to digital converters might be added to supply a digital read-out 104 for monitoring the temperature. The analogue output of the infrared detector 92 is supplied to one input of a comparator circuit 94, which is usually one of a standout operational amplifier or any one of commercially available, high sensitivity voltage comparators. The other input of the comparator is connected to the output of an adjustable reference temperature source 96, which is calibrated in units of the temperature monitored by the fiber optic element. As was explained above, it is desirable to be able to adjust the reference voltage to two different levels. The first temperature level, such as $T_{2(1)}$, is selected to be somewhat below the final desired surface temperature $T_{2(2)}$. To obtain this two-level operation, the reference source is adjusted to two output voltage ranges in such a manner that the adjustable voltage corresponding to a given position of a potentiometer slider contact is always a certain predetermined fraction when operating on the first range, corresponding to the lower temperature level $T_{2(1)}$, then the same slider position corresponding to a higher temperature level corresponding to the desired final temperature $T_{2(2)}$. A switching device 98 permits the change in the reference voltage. This is accomplished by an output pulse derived from the output terminal of the comparator 94 when the first temperature level is obtained. When the infrared detector senses the first temperature level, the output pulse of the comparator 94 actuates the switching device 98 and a similar pulse is applied to a timing circuit 100 which permits the temperature to remain at the first level, such $T_{2(1)}$, for a length of time selected by the adjustment of the timing circuit, such as $(t_2 - t_1)$. Once the switching device is positioned so that the output voltage of the reference temperature source 96 corresponds to a final higher temperature level, the comparator will once again generate a pulse when the final temperature is reached. During desired dwell times, such as $(t_2 - t_1)$ and $(t_4 - t_3)$, the temperature of the workpiece is kept constant by an on-off regulation of the inventor power, by means of supplying a proper signal to the on-off SCR 86. This is accomplished by a relay circuit 66 energized by the impulses of an AND gate 84. The AND gate 84 operating in such a manner that the relay circuit 66 can be operated only during the duration of the time cycles of either timing circuits 100 or 102 and also upon receipt of a proper pulse from the comparator 94. The relay circuit will be closed, energizing a D.C. source included in the relay circuit and supplying a D.C. triggering gate signal to the gate on the on-off SCR 86 which operates in the zero switching manner. Each time the temperature of the workpiece 20 is such that it supplies an output signal to the infrared detector which is below the set output voltage of the reference source, the relay circuit 66 will operate to apply a positive D.C. gate voltage to SCR 86 by supplying power to the filter 88 and inverter 90. As soon as the predetermined temperature is obtained, the output signal of comparator 94 will invert and relay circuit 66 will operate in such a manner as to remove the gating signal from the on-off SCR 86, thereby ceasing to supply power to the inverter. The entire operation is started by depressing a start push button 81, thereby discharging a capacitor 80 and thus applying a triggering source to the trigger pulse and commutating circuit 82, more specifically, to one of two SCRs contained in the commutating circuit. The output of a first SCR in the commutating circuit supplies one of the sustaining signals to the AND gate. As soon as the time set by the timing circuit 102 has ended, the timing circuit will supply a turn-off signal to a second SCR in the commutating circuit, thereby removing the sustaining signal from the AND gate and simultaneously the signal through the relay circuit from the on-off SCR, thus terminating operations.

Turning now to FIG. 7, adjustable reference temperature source circuitry and associated circuitry described in the block diagram of FIG. 6 will be more specifically described. For purposes of this invention, it should be understood that devices such as AND gate 84, inverter 90, comparator circuit 94, and infrared sensitive detector 92 will not be described in detail as the specific structure of these circuits are well known and the specific structure as such does not form an important aspect of this invention. The voltage dividing network or adjustable reference temperature source 96 consists of resistances 56 and 62. An additional resistor 60 may be placed in parallel with resistor 62. Resistor 62 will be variable as by a precision potentiometer 61. This potentiometer establishes the desired temperature level. When resistance 60 is utilized, it is understood that the resistance value of 62 is large in comparison to that of 60, thus inserting a neglibible influence on the value of 60. Resistance 58 represents the resistance which, when connected in parallel to 62, will lower the value of the difference of the reference voltage across 62. For a desired 5% difference between final and intermediate temperature levels, the value of resistance 58 in FIG. 7 would have to be approximately 18 times that of resistance 60. The connection of resistance 58 in parallel to resistance 62 is accomplished by the switching device 98, which includes a relay contact 64 in conjunction with relay 28 in the commutating circuit. The relay contact 64 being normally open. When the silicon controlled rectifier 32 is triggered into conduction by means of a starting signal to the main inverter circuit, relay 28, as part of the switching device 98, will be energized and contact 64 will be closed. A resistance 26 is connected in parallel across the relay winding 28 for purposes of stability of operation. The reference voltage appearing between slider 61 and the negative terminal of the supply voltage is compared with the output of the sensing detector 92.

The output of the detector 92 and the reference temperature source 96 are thus fed into a voltage comparator circuit 94 as soon as the temperature corresponding to the reduced reference voltage in circuit 96 is obtained, the differential amplifier type voltage sensing comparator circuit 94 will send a turnoff signal to the turnoff gates of the inverter and simultaneously initiate a timing circuit 100 consisting primarily of a unijunction transistor 48 and a time constant determining network 46 and 50. The AND gate 84 is connected at the output of the comparator circuit 94 and the output of the AND gate energizing the relay 66 but only if both output signals from the comparator circuit and an additional input signal corresponding to the voltage drop across the resistance 34 in the circuit of the silicon controlled rectifier 32 are present. Under these conditions, when the first temperature level $T_{2(1)}$ is reached, relay 66 will be energized closing the normally open contact 42 from the time delay circuit 100. At the end of the selected time delay, such as $(t_2 - t_1)$, as determined by the value of resistance 46 and capacitor 50, unijunction transistor 48 will be triggered into conduction, driving a signal across resistance 40 which will trigger SCR 38 thus turning off SCR 32. When 32 is turned off, relay 28 will no longer be energized and contact 64 will open thus restoring the reference signal appearing across 60 respectively across the slider and negative terminals of potentiometer 61 to its original value and corresponding to the final desired temperature $T_{2(2)}$. From here on, because the AND gate 84 does not receive the additional signal from the voltage drop across resistor 34, only the output of the differential voltage sensor of comparator circuit 94 will be operative, applying turnoff signal to the inverter when the final temperature is achieved. If an additional dwell time is required after reaching the final temperature, an additional timer circuit such as 102 can be used which is triggered from the turnoff pulse appearing across resistance 40 when 38 is turned on thereby turning off 32. This timer will then permit in the normal manner to operate the inverter for any desired additional time period and for purposes of providing a dual time for the heated components.

The operation of the second timer 102, in conjunction with the commutating unit $82^1$, is now described as follows. At the end of the first timing cycle, timer 100 will provide a signal pulse across resistor 40, thereby triggering SCR-38 in the commutating unit 82, thus turning off SCR-34. The same triggering pulse appearing across resistance 40 of 100 will also supply a starting pulse to the gate of SCR-$32^1$ in commutating unit $82^1$, thereby initiating the operation of timer 102 in the same manner as timer 100 was initiated by a pulse applied to the gate of SCR-32 in commutating unit 82. Note that the comparator circuit 94 is still supplying a signal to AND gate 84 in the same manner as was the case in the first temperature range. At the same time, a voltage differential appearing across resistance $34^1$ of the commutating unit $82^1$, associated with the second timer 102, is supplied to the and gate 84, therewith satisfying the condition that only when both a signal from the comparator output of 94 and voltage across $34^1$ are present will the and gate be operative in such a manner that it supplies a positive D.C. signal through the relay circuit 66 to the on-off SCR-86. In fact, this means that once the first temperature is reached, corresponding to a situation whereby contact 64 is closed, placing resistance 58 effectively in parallel with resistance 60 of the reference signals, thereby establishing control for the first temperature level, operation at this first temperature level will be determined for a time duration corresponding to the setting of resistance 46 in timer 100, and after timer 100 has been turned off by virtue of a trigger pulse to the gate of SCR-38 in the commutating unit 82, both the commutating circuit $82^1$ and, at the same instant, also timing circuit 102 is energized. This corresponds to an opening of the contact 64 in 98, which means that during the time period established by timer 102 the system will regulate to a higher temperature determined by the setting of 61 on potentiometer 62 and governed by the new higher voltage appearing across resistance 60.

FIG. 8 shows an alternate embodiment of the adjustable reference temperature source 96 which utilizes an operation transistor 98a replacing the relay 28 and contact 64 in the above embodiment. A soon as 98a is triggered into conduction, resistance 58a will be connected to the bottom of 62a. Accordingly, the resistance in series with 56a will be the parallel combination of 58a and 62a, thereby effectively reducing the voltage across 62a and establishing an output signal corresponding to a lower temperature level, such as $T_{2(1)}$.

I claim:

1. An induction heating and temperature responsive control apparatus in combination including an inverter circuit, an induction core unit, including a generally U-shaped ferromagnetic core with an exciter winding wrapped thereabout and in operative connection with the inverter circuit and means integrated with the core to monitor the surface temperature of a workpiece as it is heated by virtue of the magnetic circuit formed with the workpiece by the core, further including means responsive to the temperature, monitoring means for automatically controlling the output of the inverter so as to stop the supply of temperature inducing current to the core at a predetermined surface temperature of the workpiece, said means controlling the output including means for automatically and successively controlling the inverter to maintain a first predetermined temperature for a predetermined time period followed by a subsequent period of operation to increase the temperature to a second temperature level and maintain said second temperature level.

2. An induction heating apparatus including a two-level temperature control including a power supply inverter operatively connected to energize an induction core unit, the induction core unit including a temperature sensing element operative therewith including means to convert temperature level sensed to a directly related output voltage, an adjustable, voltage-dividing, reference temperature source, voltage comparator circuit accepting and comparing voltages from the temperature sensing means and the adjustable reference temperature source and including means for producing a first signal when said voltages are equal, means responsive to said first signal including a first time circuit to control the inverter to maintain a first temperature level, switch means responsive to said first signal to increase the value of the reference temperature source after a first predetermined time delay created by said first timing circuit following the initiation of the first signal, means to activate a period of operation of the inverter to increase the temperature to a second, higher temperature level until a second signal is produced by the voltage comparator circuit, at the end of the operating period at the higher temperature level wherein the heating apparatus automatically sensing the temperature level of the workpiece and is capable of controlling the temperature thereof at two levels.

3. An induction heating apparatus in accordance with claim 2, wherein the adjustable reference temperature source comprises a voltage dividing network including means to vary the value of one of the divided series combined resistors and select the reference temperature level, means placing a further resistor in parallel with said one resistor to decrease the voltage appearing across the said one resistor to temporarily reduce the value of the voltage output from the reference temperature source.

4. An induction heating apparatus in accordance with claim 3, wherein the means to vary the value of one of the divided series combined resistors is a potentiometer device wherein the desired reference temperature level may be input thereto.

5. An induction heating apparatus in accordance with claim 2, including a second timing circuit responsive to said second signal operative to turn off the inverter after a second predetermined time delay following the initiation of the second signal.

6. An induction heating apparatus in accordance with claim 5, wherein said second predetermined time delay is longer than said first predetermined time delay.

7. An induction heating apparatus in accordance with claim 2, wherein the induction core unit includes a fiber optic element integrated therewith operatively connected to an infrared sensitive detector which includes a linearizing amplifier as the means to convert temperature level sensed by the fiber optic element into an output voltage to be compared with the reference temperature source in the comparator circuit.

8. A method of heating, by induction, a sheet of ferromagnetic base material which is coated with a nonconducting, nonferromagnetic surface material, such as paint, including the step of heating said base material and simultaneously monitoring the temperature of the surface material, automatically stopping the heat input to the base material when temperature of the surface material reaches a first, predetermined temperature level which is lower than a second, predetermined desired temperature level, allowing the temperature of the base material to equalize with the temperature of the surface material at said first temperature level, automatically resuming heat input to the base material until the surface temperature reaches the second predetermined temperature level, retaining the second temperature level for a predetermined time interval and thereafter deactivating the induction heating apparatus.

9. The method of claim 8, wherein the heating of the base material is accomplished by induction heating with the induction heating apparatus being turned of when the temperature of surface material reaches said first temperature level and is subsequently turned on when the temperatures of the surface material and base material are substantially equal.

10. A device for sensing and controlling temperature of a workpiece which is being heated by a selectively operable energy source, including a temperature sensing element and means to convert the temperature level sensed to a directly related output voltage, an adjustable, voltage-dividing, reference temperature source, voltage comparator circuit accepting and comparing voltages from the temperature sensing means and the adjustable reference temperature source and including means for producing a first signal when said voltages are equal, means responsive to said first signal including a first timing circuit to control the energy source to maintain a first temperature level, switch means responsive to said first signal to increase the value of the reference temperature source after a first predetermined time delay created by said first timing circuit following the initiation of the first signal, means to activate a period of operation of the energy source to increase the temperature of the workpiece to a second, higher temperature level until a second signal is produced by the voltage comparator circuit.

11. The device of claim 10, including a second timing circuit responsive to said second signal operative to turn off said energy source after a second predetermined time delay following the initiation of the second signal.

* * * * *